(12) United States Patent
Harrison et al.

(10) Patent No.: US 9,956,868 B1
(45) Date of Patent: May 1, 2018

(54) STORAGE CONTAINER WITH IMPROVED MOUNTING ASSEMBLY

(71) Applicants: Craig Harrison, Gulf Breeze, FL (US); Harold Clinton Daws, II, Gulf Breeze, FL (US)

(72) Inventors: Craig Harrison, Gulf Breeze, FL (US); Harold Clinton Daws, II, Gulf Breeze, FL (US)

(73) Assignee: Daws Manufacturing Company, Inc., Pensacola, FL (US)

( * ) Notice: Subject to any disclaimer, the term of this patent is extended or adjusted under 35 U.S.C. 154(b) by 30 days.

(21) Appl. No.: 15/335,870

(22) Filed: Oct. 27, 2016

(51) Int. Cl.
*B60K 15/00* (2006.01)
*B60K 15/067* (2006.01)
*F16B 35/00* (2006.01)
*F16B 43/00* (2006.01)
*B60K 15/063* (2006.01)

(52) U.S. Cl.
CPC ............ *B60K 15/067* (2013.01); *F16B 35/00* (2013.01); *F16B 43/00* (2013.01); *B60K 2015/0638* (2013.01)

(58) Field of Classification Search
CPC .......... B60K 15/067; B60K 2015/0638; F16B 35/00; F16B 43/00
USPC ........................................................ 224/404
See application file for complete search history.

(56) References Cited

U.S. PATENT DOCUMENTS

| | | | | |
|---|---|---|---|---|
| 4,564,167 A | * | 1/1986 | Smith | B60R 11/06 224/404 |
| 4,779,434 A | * | 10/1988 | Derman | E05B 67/383 70/163 |
| 5,947,356 A | * | 9/1999 | Delong | B60R 9/00 224/404 |
| 6,375,054 B1 | * | 4/2002 | Lance | B60P 3/14 224/404 |
| 6,422,629 B2 | * | 7/2002 | Lance | B60R 11/00 224/403 |
| 6,626,479 B1 | * | 9/2003 | Skoug | B60R 9/00 224/404 |
| 6,626,480 B2 | * | 9/2003 | Anderson | B60P 7/08 224/404 |
| 6,886,876 B1 | * | 5/2005 | Damian | B60R 9/00 224/404 |
| 6,945,580 B1 | * | 9/2005 | Hentes | B60R 9/00 224/404 |
| 9,849,839 B2 | * | 12/2017 | Buckland | B60R 9/06 |
| 2001/0054632 A1 | * | 12/2001 | Larsen | B60R 5/00 224/275 |
| 2015/0048129 A1 | * | 2/2015 | Wilson | B60R 9/065 224/404 |
| 2016/0167718 A1 | * | 6/2016 | Wilson | B62D 33/0207 224/404 |

* cited by examiner

*Primary Examiner* — Peter Helvey
(74) *Attorney, Agent, or Firm* — GrayRobinson, P.A.; Thomas L. Kautz

(57) ABSTRACT

A storage container is provided having improved mounting assemblies for connection to the bed of a transport vehicle such as a truck or trailer.

5 Claims, 3 Drawing Sheets

STORAGE CONTAINER WITH IMPROVED MOUNTING ASSEMBLY

FIELD OF THE INVENTION

This invention relates to storage containers, and, more particularly, to storage tanks having an improved mounting assembly for connection to the bed of a transport vehicle such as a truck or trailer.

BACKGROUND OF THE INVENTION

Storage tanks for transporting fluids using trucks and similar vehicles are preferably mounted to the bed of the vehicle or trailer to avoid capsizing or movement of the tank during transit. In some designs, a number of brackets or flanges are mounted at spaced locations along the base of the tank each formed with one or more bores. The tank is positioned on the bed of the vehicle or trailer, and holes are drilled through the bed to align with the bores in the flanges. The tank is secured to the bed by inserting a carriage bolt from the bottom of the bed through the aligning bore in each flange and the holes drilled in the bed. The threaded end of each bolt, which is exposed above the flanges, receives a rubber or urethane bushing and then a lock nut, such as a nylon-insert lock nut, is tightened down atop the bushing to hold the carriage bolt and tank in place. The resiliency of the bushing is intended to provide a degree of vibration damping between the flanges and bed.

The mounting system described above is readily susceptible to over-tightening. The end of each carriage bolt which extends above the flanges is threaded along its entire length such that the lock nut can be tightened down against the bushing with too much force, resulting in damage to and/or excessive compression of the bushing. When that occurs, the vibration-damping capability of the bushing is reduced or eliminated and the bushing may be damaged.

SUMMARY OF THE INVENTION

This invention relates to storage containers having an improved mounting assembly for connection to the bed of a transport vehicle such as a truck or trailer.

In the presently preferred embodiment, the storage container or tank is provided with a number of flanges mounted to its base portion. Each of the flanges is formed with at least one bore, and holes may be drilled in the bed of the vehicle or trailer to align with such bores. A mounting assembly is employed to mount the tank in place which comprises a shaft, a stop fixed to the shaft and a resilient bushing formed of urethane, rubber or other elastomeric material capable of absorbing shock and vibration. The shaft is formed with an upper threaded section, a lower threaded section and an unthreaded section between them. The stop is welded or otherwise permanently affixed to the shaft at the juncture of the upper threaded section and unthreaded section.

The tank is mounted on the bed by inserting the shaft of the fastener assembly through the aligning holes in the bed and each flange such that the stop is located between the top surface of the bed and the lower surface of a given flange. A washer is placed in between the bottom of the bed and a lower nut, which then may be tightened down along the lower threaded section of the shaft against the bed. The bushing is placed along the unthreaded section of the shaft and into engagement with a flange. An upper nut may then be tightened down along the upper threaded section of the shaft against a washer placed over the bushing.

In order to avoid excess tightening of the bushing, the length of the threads on the upper threaded section of the shaft is limited. Consequently, the upper nut is permitted to travel only a short distance in a direction toward the bushing along such upper threaded section when tightened before encountering the unthreaded section of the shaft. This construction limits the extent of compression that the bushing may undergo, and as a result, the tank may be securely mounted to the bed while retaining the shock absorbing capability of the bushing without damaging it.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE PREFERRED EMBODIMENT

Figure 1:
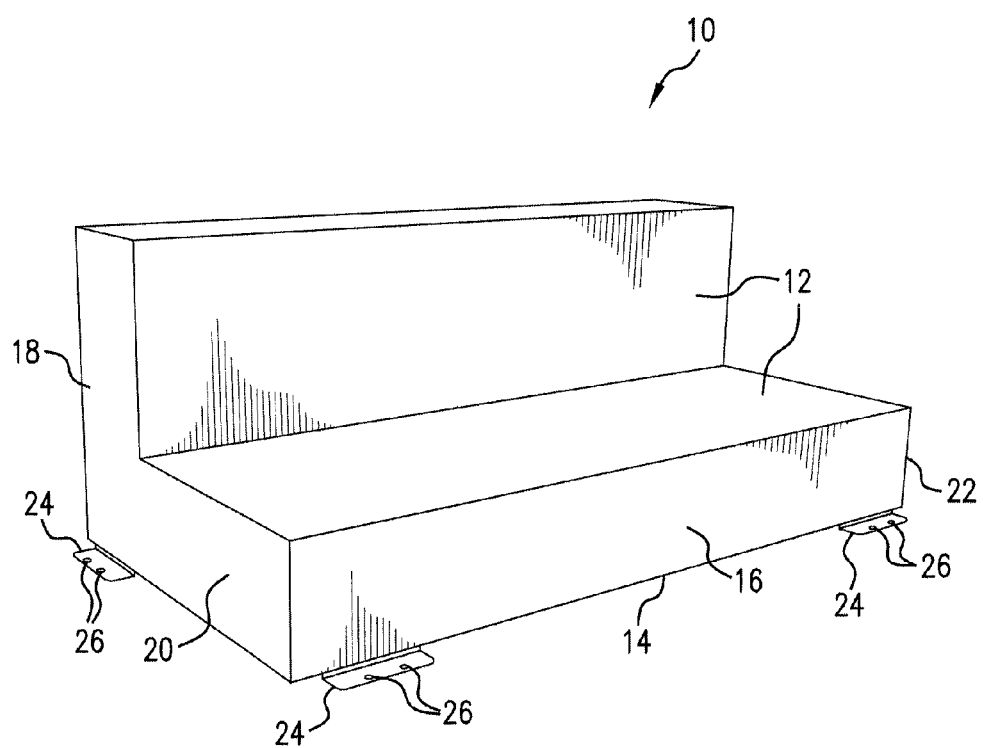
FIG. 1 is a perspective view of a storage tank secured to the bed of a vehicle or trailer with the fastener assembly of this invention.

Referring to the Figs., a storage container in the form of a transfer tank 10 is illustrated having a top wall 12, bottom wall 14, front wall 16, back wall 18 and opposed end walls 20, 22 which are interconnected to form a closed interior. For purposes of the present discussion, the terms "top," "upper," "bottom," "lower," "front" and "back" refer to the spatial orientation of the tank 10 as illustrated in the Figs. A number of flanges 24 are mounted to the bottom part of the tank 10 which may extend outwardly from the bottom wall 14. Each flange 24 is preferably a flat plate made of metal or other rigid material. Alternatively, the flanges 24 may be formed in an L-shape or similar configuration in which case they may be mounted to both the bottom wall 14 and one of the other walls 16-22. Each of the flanges 24 is formed with at least one bore 26.

Figure 2:
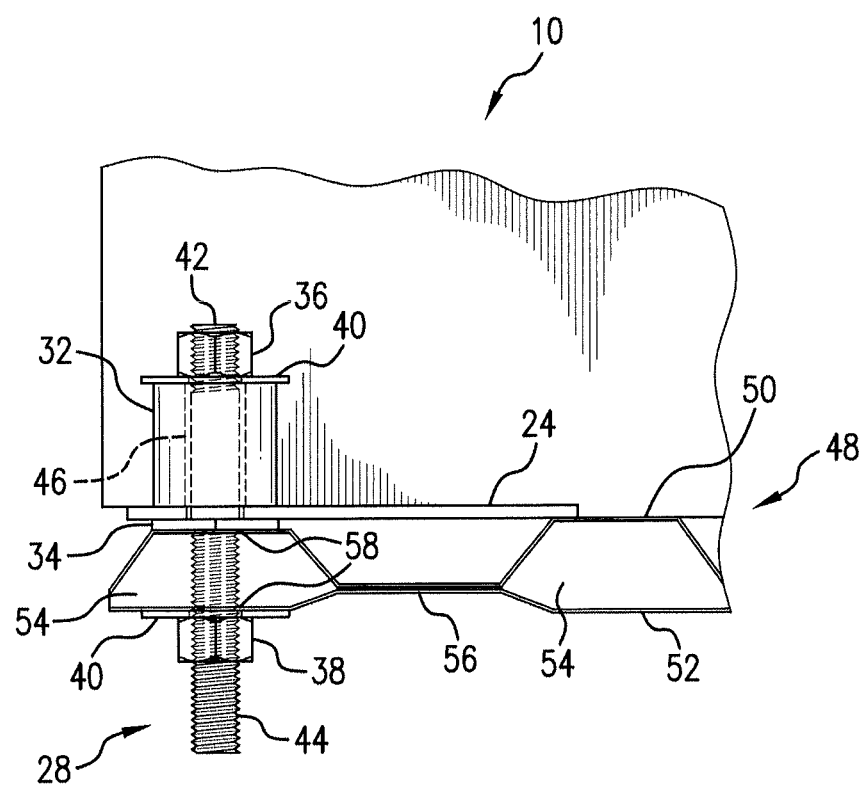
FIG. 2 is an enlarged view of the encircled area depicted in FIG. 1.
Figure 3:
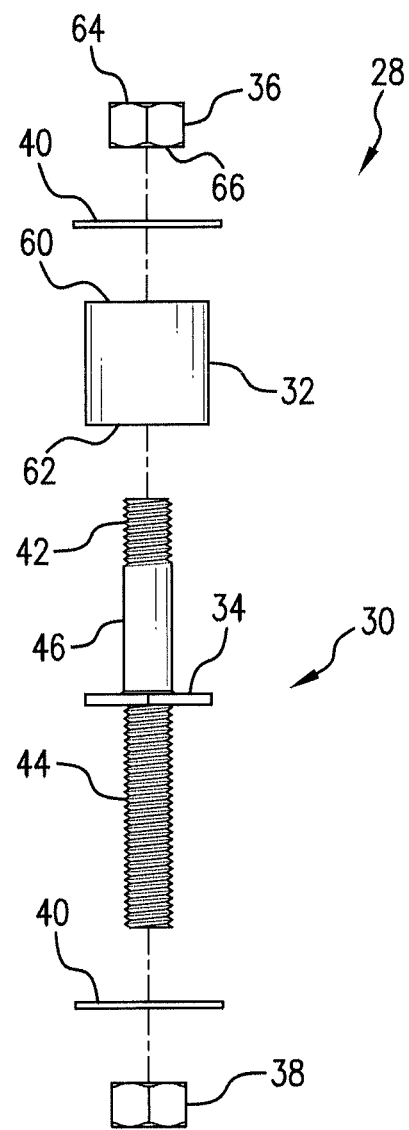
FIG. 3 is a disassembled, perspective view of the fastener assembly herein.

The mounting assembly 28 of this invention is depicted in FIGS. 2 and 3. It comprises a shaft 30, a bushing 32, a stop 34, upper and lower nuts 36, 38 and two washers 40. The shaft 30 is formed with an upper threaded section 42, a lower threaded section 44 and an unthreaded section 46 which extends between the sections 42, 44. The stop 34 is fixed to the shaft 30, such as by welding, at the juncture of the lower threaded section 44 and the unthreaded section 46. The bushing 32 is cylindrical in shape, with a central bore which is sized to receive the unthreaded section 46 of the shaft 30. Preferably, the bushing 32 is made from an elastomeric material such as rubber or urethane, or other suitable resilient material.

The transfer tank 10 is mounted to the bed 48 of a truck, trailer or other vehicle, a portion of which is schematically shown in FIG. 2. For purposes of illustration, the bed 48 is depicted as having an upper wall 50 and a lower wall 52 formed with alternating cavities 54 where they are separated and areas 56 where the walls 50, 52 meet one another. The upper wall 50 defines an upper surface of the bed 48, and the lower wall 52 a lower surface.

Initially, the tank 10 is placed at the desired location in the bed 48 and a hole 58 is drilled through the upper and lower walls 50, 52, preferably where a cavity 54 is located, in alignment with at least one of the bores 26 in each flange 24. Each of the fastener assemblies 28 is positioned such the lower threaded section 44 of its shaft 30 extends through a hole 58 in the upper and lower walls 50, 52 of the bed 48 and the stop 34 rests atop the upper wall 50. In this position, a portion of the lower threaded section 44 protrudes from the lower wall 52 of the bed 48 which receives a washer 40 and lower nut 38. The lower nut 38 may be tightened down along the lower threaded section 44 against the washer 40 and the lower wall 52 to secure the shaft 30 in place relative to the bed 48. The tank 10 may then be lowered onto the bed 48 so that a bore 26 in each of its flanges 24 receives the shaft 30 of a fastener assembly 28. Each stop 34 is therefore captured between the lower surface of a flange 24 and the upper wall 50 of the bed 48.

An important feature of this invention is that each fastener assembly 28 is configured in such a way as to prevent over-tightening of the bushing 32. Specifically, the shaft 30 is considered to have a "length" dimension extending in a direction from the end of the upper threaded section 42 to the end of the lower threaded section 44. The bushing 32 has a "height" dimension between its upper end 60 and lower end 62, and the upper nut 36 has a height dimension between its upper and lower ends 64, 66. In the presently preferred embodiment, the length of the unthreaded section 46 is greater than the height of the bushing 32 by an amount approximately equal to the thickness of a flange 24. Further, the length of the upper threaded section 42 of shaft 30 is approximately the same as the height of the upper nut 36. Accordingly, to complete mounting of the tank 10 to the bed 48, the bushing 32 is placed onto the shaft 30 such that its lower end 62 engages a flange 24 and its upper end 60 is approximately flush with the juncture of the unthreaded section 46 and upper threaded section 42 of the shaft 30. A washer 40 may be placed over the upper end 60 of the bushing 32 and then the upper nut 36 may be tightened down against the washer 40 and bushing 32. Because the length of the upper threaded section 42 is about the same as the height of the upper nut 36, the upper nut 36 may only be tightened down along the upper threaded section 42 until it encounters the unthreaded section 46. At that point, the upper nut 36 may not be tightened further which protects the bushing 42 against excess compression. The mounting assemblies 28 of this invention ensure that the tank 10 is securely mounted to the bed 48, but since the bushings 32 are not over-tightened or excessively compressed they substantially retains their vibration absorption capability and the risk of damage thereto is reduced if not eliminated.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. For example, the storage tank 10 is illustrated as having an L-shaped top wall 12, front and back walls 16, 18 and opposed end walls 20, 22. It should be understood that the tank 10 may be formed in a square or rectangular shape with a planar top wall, or in a cylindrical, oval or similar shape having a top wall, bottom wall and a side wall extending between the top and bottom walls. Consequently, the term "side wall" as used herein refers to the front, back and end walls 16-22 of the tank 10 illustrated in FIG. 1 collectively, or to corresponding walls in a square or rectangular tank, or, to a circular, oval or similarly shaped wall extending between top and bottom walls of a tank.

Therefore, it is intended that the invention not be limited to the particular embodiment disclosed as the best mode contemplated for carrying out this invention, but that the invention will include all embodiments falling within the scope of the appended claims.

What is claimed is:

1. A container for transport on the bed of a vehicle or trailer having upper and lower surfaces, comprising:
   a top wall, a bottom wall and a side wall interconnected to form an interior;
   a number of flanges extending from at least one of said bottom wall and said side wall, each of said flanges being formed with at least one bore which aligns with a hole formed in the bed;
   a mounting assembly connecting each of said flanges to the truck bed, each of said mounting assemblies comprising:
   (i) a shaft having a first threaded section, a second threaded section and an unthreaded section located between said first and second threaded sections;
   (ii) a stop fixed to said shaft at the juncture of said second threaded section and said unthreaded section;
   (ii) a bushing positioned along said unthreaded section;
   said shaft of one of said mounting assemblies being inserted through said at least one bore in each of said flanges and through an aligning hole in the bed such that said stop is located between the upper surface of the bed and said flange and said bushing engages said flange, each of said mounting assemblies being secured in place by a first nut tightened down along said first threaded section against said bushing and by a second nut tightened down along said second threaded section against the bottom surface of the bed.

2. The container of claim 1 in which said shaft of each of said mounting assemblies has a length dimension measured in a direction between said first and second threaded sections, said bushing having a height measured between a first end and a second end thereof, said unthreaded section of said shaft having a length dimension greater than said height of said bushing.

3. The container of claim 2 in which said first threaded section has a length dimension, said first nut having a height measured between a first surface and a second surface thereof, said length dimension of said first threaded section being approximately the same as said height of said first nut such that the extent of movement of said first nut along said first threaded section when tightened down against said bushing is limited to avoid excess compression of said bushing between said first nut and said flange.

4. The container of claim 1 in which said bushing is formed of an elastomeric material or other resilient material.

5. The container of claim 1 further including a first washer located along said shaft of each of said mounting assemblies between said first nut and said bushing, and a second washer located along said shaft of each of said mounting assemblies between said second nut and the bottom surface of the bed.

* * * * *